(12) United States Patent
Sridhar et al.

(10) Patent No.: US 11,748,655 B2
(45) Date of Patent: Sep. 5, 2023

(54) CLASSIFICATION OF MESSAGES USING LEARNED RULES

(71) Applicant: Apple Inc., Cupertino, CA (US)

(72) Inventors: Srikrishna Sridhar, Seattle, WA (US); Aaron B. Franklin, Seattle, WA (US); Marina Gray, Sunnyvale, CA (US); Shayne R. Longpre, Cupertino, CA (US); Shiwen Zhao, Seattle, WA (US); Torsten Becker, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 878 days.

(21) Appl. No.: 16/583,131

(22) Filed: Sep. 25, 2019

(65) Prior Publication Data

US 2020/0380408 A1 Dec. 3, 2020

Related U.S. Application Data

(60) Provisional application No. 62/855,708, filed on May 31, 2019.

(51) Int. Cl.

| | |
|---|---|
| *G06F 16/00* | (2019.01) |
| *G06N 20/00* | (2019.01) |
| *G06F 21/60* | (2013.01) |
| *H04L 9/06* | (2006.01) |
| *H04L 51/42* | (2022.01) |
| *G06F 16/35* | (2019.01) |
| *H04L 67/01* | (2022.01) |

(52) U.S. Cl.
CPC ............. *G06N 20/00* (2019.01); *G06F 16/35* (2019.01); *G06F 21/60* (2013.01); *H04L 9/0643* (2013.01); *H04L 51/42* (2022.05); *H04L 67/01* (2022.05)

(58) Field of Classification Search
None
See application file for complete search history.

(56) References Cited

U.S. PATENT DOCUMENTS

| | | | |
|---|---|---|---|
| 7,519,668 B2* | 4/2009 | Goodman | H04L 51/212 709/201 |
| 9,282,073 B1* | 3/2016 | Avital | H04L 51/226 |
| 2007/0153782 A1* | 7/2007 | Fletcher | H04L 43/00 370/466 |
| 2013/0166490 A1* | 6/2013 | Elkins | G06N 5/02 706/47 |
| 2015/0088967 A1* | 3/2015 | Muttik | H04L 63/1416 709/203 |

(Continued)

*Primary Examiner* — Hasanul Mobin
(74) *Attorney, Agent, or Firm* — BAKERHOSTETLER

(57) ABSTRACT

The subject technology receives, in an application on an electronic device, a message, the message being associated with a user and including information in a header portion of the message. The subject technology determines, on the electronic device, a current state of messaging activity of the user based at least in part on a log of previous events associated with the user, where the log of previous events includes information that has been hashed using a cryptographic hash function. The subject technology determines, on the electronic device using a set of rules provided by a machine learning model, that the user is likely to view the message based on the current state of the messaging activity of the user. The subject technology sets, on the electronic device, an indication that the message is important based on the determining.

23 Claims, 8 Drawing Sheets

(56) References Cited

U.S. PATENT DOCUMENTS

| | | | | |
|---|---|---|---|---|
| 2015/0199045 | A1* | 7/2015 | Robucci | G06F 3/0488 |
| | | | | 345/174 |
| 2018/0309784 | A1* | 10/2018 | Chen | H04L 63/0435 |
| 2019/0251759 | A1* | 8/2019 | Lora | G06Q 10/0833 |
| 2020/0012423 | A1* | 1/2020 | Cinek | H04M 19/042 |
| 2020/0067861 | A1* | 2/2020 | Leddy | G06F 21/6245 |
| 2021/0021426 | A1* | 1/2021 | Scherrer | H04L 63/123 |
| 2021/0234683 | A1* | 7/2021 | He | H04L 9/3239 |

* cited by examiner

CLASSIFICATION OF MESSAGES USING LEARNED RULES

CROSS-REFERENCE TO RELATED APPLICATIONS

The present application claims the benefit of U.S. Provisional Patent Application Ser. No. 62/855,708, entitled "Classification of Messages Using Learned Rules," filed May 2019, which is hereby incorporated herein by reference in its entirety and made part of the present U.S. Utility Patent Application for all purposes.

TECHNICAL FIELD

The present description generally relates to classifying messages, including privacy preserving classification of messages.

BACKGROUND

Software engineers and scientists have been using computer hardware for machine learning to make improvements across different industry applications including image classification, video analytics, speech recognition and natural language processing, etc. Email messages, text messages, and other types of messaging have become popular forms of communicating across computer networks.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
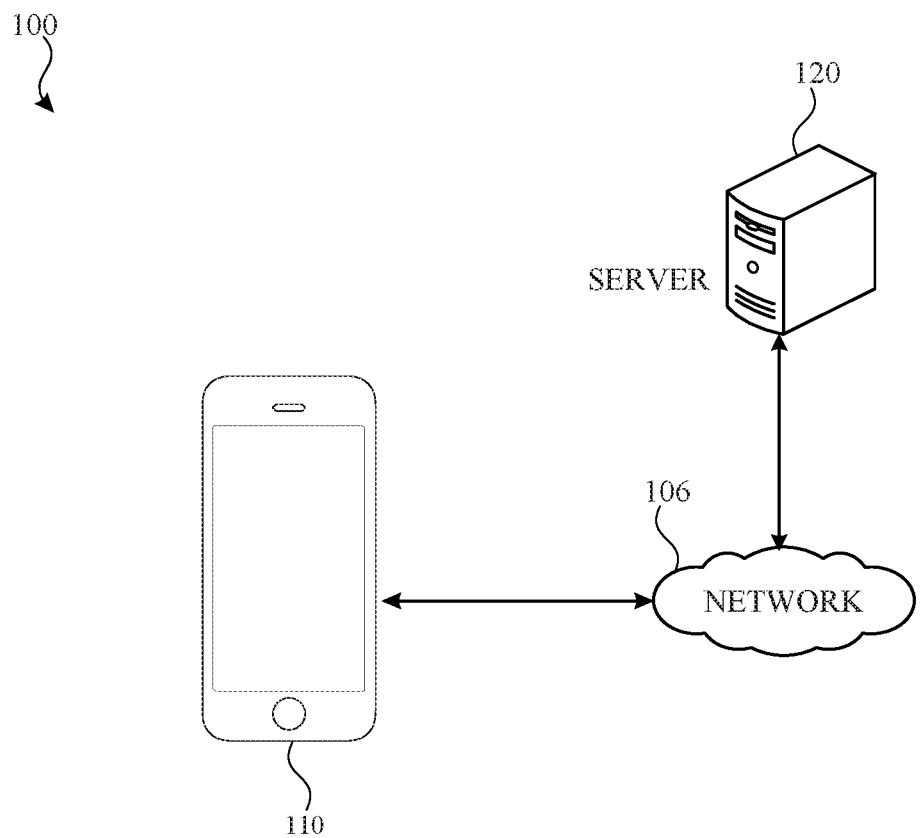
FIG. 1 illustrates an example network environment for classifying messages while preserving privacy in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a significant rise in popularity in recent years due to the availability of massive amounts of training data, and advances in more powerful and efficient computing hardware. Machine learning may utilize models that are executed to provide predictions in particular applications (e.g., analyzing images and videos, SPAM detection, fraud detection, etc. among many other types of applications. Machine learning is now also being applied to different forms of digital communication including email and/or forms of messaging.

Various forms of messaging, such as email messaging, have been convenient forms of communication between users. For example, users may send and receive email messages (or "e-mail", "e-mail messages") over computer networks. In an example, email messages are received at a given user's email account and are displayed by an email application, individually, in some sort of order (e.g., a chronological order). In some instances, however, a massive amount of received messages (e.g., email messages) can result in a confusing user experience thereby making it difficult for users to distinguish between messages that may be important to them and messages that may not be important to them. As mentioned herein, an "important" email may refer to an email that has a high likelihood of being read by a given user.

Moreover, users can access and view their messages on mobile electronic devices, such as smartphones. Such mobile devices can have small display screens for displaying graphical user interfaces for viewing messages. These user interfaces, for example, may allow a user to view a small number of messages at a given time, thereby requiring the user to interact with the user interface to locate messages that may be important to them, such as by scrolling through the messages. Users of these devices therefore might wish to quickly view the messages that may be important to them when accessing messages to preserve the limited power of such devices, which may be addressed by implementations of the subject technology described herein. In particular, a machine learning model may be utilized by a given mobile electronic device in order to classify/determine which messages may be important to the user of the given mobile electronic device. These 'important' messages may then be distinguished from other messages displayed in the user interface, such that the user can quickly identify and access the messages that may be important to them.

In some instances, a significant amount of data may be not be available for running a machine learning application that uses a machine learning model such as in an instance where a model is utilized on a mobile electronic device (e.g., smartphone) when the device is first activated and/or when a new email account is created. Machine learning applications include those related to handling email messages and/or other messages for a particular user, such as for classifying such messages into one or more categories. These machine learning applications can utilize a given machine learning model that run utilizing data based on messages received by the user. For a given electronic device, upon an initial activation, such training data is not available since the user has yet to receive email messages on the device.

The subject technology provides techniques for classifying/identifying messages that may be of importance to a given user. The importance of a message to a given user, as described further herein, may be based on rules, may be based on one or more signals derived from information in the message, and/or may be based on prior user interaction with the message and/or with other messages. In an implementation, such rules may include, for example, a rule for messages from a particular person (e.g., a very important person (VIP)), or a rule that classifies an email as being important to the user when the user has previously replied to a thread of messages corresponding to the message. In this regard, a message may be classified as important to a given user when the message is received from one of a set of individuals that the user has designated as very important persons (VIPs). The aforementioned classification of messages as described herein is performed on the user's device using information, e.g., header information indicating senders and/or message identifiers of the messages, that has been hashed with a salt in order to anonymize the messages. Moreover, the message body of a given message is not utilized for classifying the message as important or not important. In this manner, the privacy of a set of users that are connected with the messages can be preserved such that a rogue entity can be prevented from determining if two respective users received the same message in view of the hashed aforementioned information.

Implementations of the subject technology improve the computing functionality of a given electronic device by providing an efficient approach to identifying messages that may be of importance to a given user. These benefits therefore are understood as improving the computing functionality of a given electronic device, such as an end user device (which may generally have less computational and/or power resources available than, e.g., one or more cloud-based servers) by reducing the processing/memory resources required for the given electronic device to identify messages that may be of importance to the user.

FIG. 1 illustrates an example network environment for classifying messages while preserving privacy in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, and a server 120. The network 106 may communicatively (directly or indirectly) couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including the electronic device 110, and the server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a smartphone. The electronic device 110 may be, and/or may include all or part of, the electronic system discussed below with respect to FIG. 8.

In one or more implementations, the electronic device 110 may provide a system for storing logs of information derived from messages, such as email messages, of a user. Such messages may be received by a given application on the electronic device 110, and may be locally stored on the electronic device 110. In an example, the electronic device 110 may include a deployed machine learning model (e.g., from a server as discussed below) that provides an output of data corresponding to a classification or some other type of machine learning output. The machine learning model, in an example, may be utilized by the electronic device 110 to determine classifications based at least in part on the logs of information derived from the messages of the user. Additionally, as described further herein, fields of the logs of information derived from messages of the user may be hashed using a salt (e.g., random data) to preserve the privacy of the information based on the email messages. Moreover, in an implementation, the logs of information are based on headers in email messages and not based on information from the body (e.g., message portion) of the email messages to further preserve privacy.

The server 120 may provide a system for training a machine learning model using training data, where the trained machine learning model is subsequently deployed to the electronic device 110. The machine learning model deployed on the electronic device 110 can then perform one or more machine learning algorithms related to the email messages of the user discussed above. Further, the server 120 may provide one or more machine learning frameworks for training machine learning models and/or developing applications using such machine learning models. In an example, such machine learning frameworks can provide various machine learning algorithms and models for different problem domains in machine learning such as algorithms for classifying email messages as described further herein.

Figure 2:
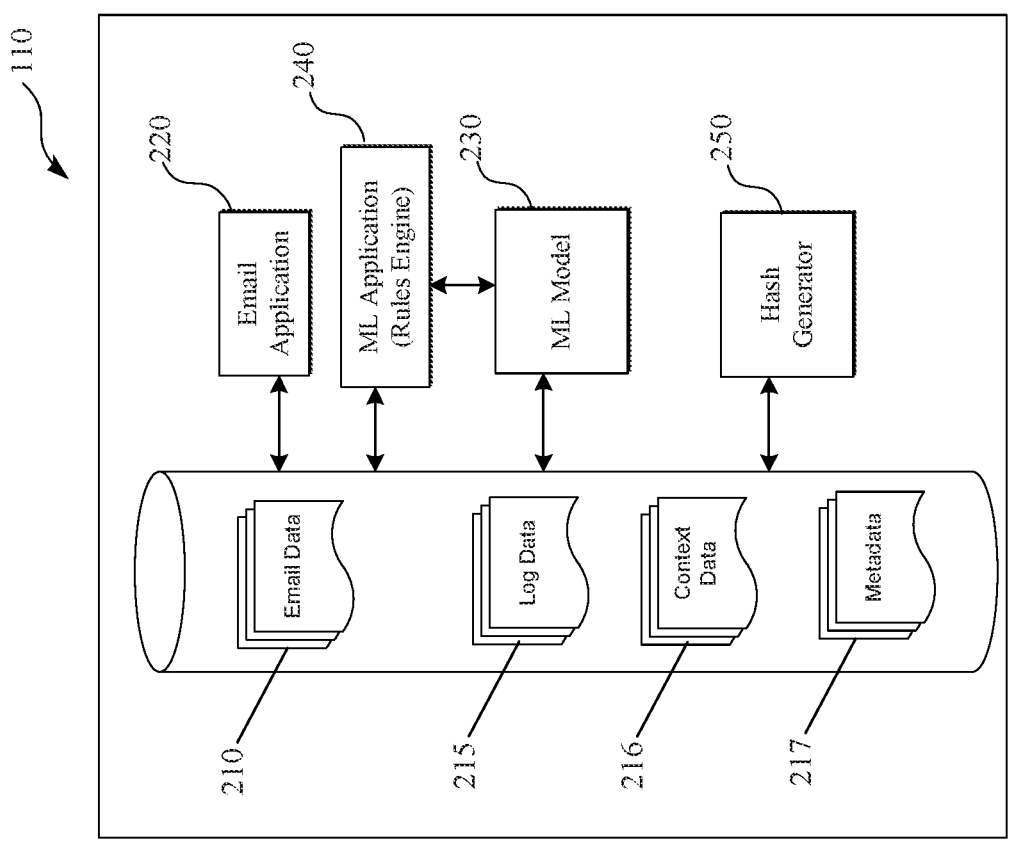
FIG. 2 illustrates an example computing architecture for a system for classifying messages while preserving privacy in accordance with one or more implementations.

FIG. 2 illustrates an example computing architecture for a system for classifying messages while preserving privacy in accordance with one or more implementations. For explanatory purposes, the computing architecture is described as being provided by the electronic device 110, such as by a processor and/or memory of the electronic device 110; however, the computing architecture may be implemented by any other electronic devices, such as the server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the electronic device 110 includes email data 210 stored in a memory corresponding to email messages (and/or other messages) of a user of the electronic device 110. An email application 220 may access the email data 210. In an example, the email application 220 is an application that enables a user to receive, compose, send, and organize emails. For example, email messages can be sorted based on a particular field, placed in particular folders, grouped into email threads, etc. Email threads are generated by grouping two or more related email messages. The email application 220 displays the email threads in a user's mailbox via a user interface. As described further herein, one or more signals can be derived from the email data 210. Examples of such signals include information included in header information such as a sender, whether a particular sender is a VIP, a number of attachments, subject words, whether a user is in the To field of an email message, whether a user is in the CC field of an email message, and/or whether a user is in the BCC field of an email message, etc.

In an example, one way to organize the email messages is by grouping related email messages into email threads. For instance, email messages having the same subject (e.g., accounting for modifications for replies (e.g., "RE:") and forwards (e.g., "FW:")) can be determined to be related to one another and grouped into an email thread. In this manner, two or more of the email messages in the user's mailbox can be organized into email threads. In one or more implementations, the email data 210 may be a portion of the user's entire email data, where the entirety of the user's email data is stored on the server 120.

In an implementation, the email application 220 is configured to provide the user with an option to mark an email or an email thread as important. For example, the email application 220 may display a "mark email" button (or other graphical element) in the email application user interface that allows the user to mark a particular email message as important when selected. In an implementation, the user can select the "mark email" button while composing a new email message to mark an outgoing email as important. In an example, when a particular email message is selected for being marked important and the email message is already included in an existing thread, the other remaining email messages in the thread may also be marked as important.

Further, the email application 220 may display a "mark thread" button (or other graphical element) in the email application user interface that allows the user to mark the email thread as important when selected. In one implementation, the user can select a particular email message that belongs to the thread. The user can then select the "mark thread" button which causes all the email messages belonging to the thread to be marked as important in the email application user interface. In an implementation, the user can select the "mark thread" button while composing a new email message to mark an email thread corresponding to an outgoing message as important.

Additionally, for email messages and/or threads that have been marked important, the email application 220 may also provide respective buttons in the email application user interface to unmark such email messages and/or threads to be not important.

As described above, an original email message and a chain of related reply messages or forwarded messages can be grouped as an email thread (or thread). In an example, the embedded attributes (e.g., header information) of an email message may contain a unique identifier (e.g., message identifier) and a chain of message identifiers which can be used to relate the email message to replies and forwards corresponding to the message. According to one implementation, the email application 220 maintains a table (or similar data structure) of message identifiers (IDs) associated with email messages that belong to an email thread. This enables the email application 220 to identify email messages as belonging to a specific thread (and as such to an important thread).

In one or more implementations, the ML model 230 may be trained on another device, such as the server 120, and then deployed to the electronic device 110. The ML application 240 can then utilize the deployed ML model 230 for classifying email messages as important. The ML model 230 can be trained on the server 120 using a larger dataset (e.g., hashed information from messages from one or more user accounts) compared to a portion of the user's email messages that are available on the electronic device 110. In this manner, a more accurate ML model can be deployed to the electronic device 110 and utilized by the ML application 240. In an example, the ML model 230 utilizes a decision tree with nodes that correspond to respective features, and information can be extracted depending on which leaf in the decision tree is accessed upon an evaluation of the information from the email messages.

The log data 215 may include one or more fields derived and/or obtained from messages received on the electronic device 110, such as email messages. An example data format that may be used to store the log data 215 is discussed further below. In an example, the log data 215 includes respective lines of information for events that occur in connection with messages in the user's account. In particular, the log data 215 includes information corresponding to data from a header of a message (e.g., address fields, message IDs, etc.) and associated event information indicating an event that has occurred in connection with the message. An event can correspond to actions such as, but not limited to, receiving an email, forwarding an email, replying to an email, deleting an email, reading an email, etc.

Context data 216 may be generated based on the log data 215, which is described further herein. In an example, the ML application 240 can keep track of context corresponding to a current state of the user's messaging history in their email account, which is stored in the context data 216. A context, for example, represents the user's aggregated activity with email messages over a period of time based at least in part on the aforementioned event information that is stored in the log data 215. The context data 216 is continuously maintained in an example in order to track the current state of messages of a given user's account.

The system further includes a hash generator 250. The hash generator 250 may generate hashed data based on the log data 215 and store the hashed data in metadata 217. In an implementation, the hash generator 250 may generate a salt (e.g., random data) to include with one or more portions (e.g., fields) of the log data 215 to be hashed. This salt may be stored as part of the metadata 217 along with the hashed data. In another implementation, any portion of hashed data may be stored in the log data 215 instead of the metadata 217. Such hashed data may be sent to the server 120 in order to train a new version of the ML model 230. In an example, the electronic device 110 may periodically send the log data 215 and/or the metadata 217 to the server 120 for training the new version of the ML model 230.

Although the hash generator 250 is illustrated as being separate from the ML application 240, in an implementation, a hash generator with the same functionality as the hash generator 250 may be included as part of the ML application 240 thereby enabling the ML application 240 to perform similar or the same functions as a separate hash generator (e.g., the hash generator 250).

In an implementation, the ML application 240, utilizing the ML model 230, may classify email messages as being important to a given user based on sets of rules described further below. The sets of rules, for example, are applied on the log data 215 and/or the context data 216, which is discussed further below in FIG. 3. For example, the sets of rules include a set of curated rules that are predefined, and a set of learned rules based on the ML model 230. The following discussion begins with a description of the sets of rules utilized by the subject system.

The following discussion describes a high level data flow for utilizing curated rules to classify email messages and subsequently utilizing learned rules from the ML model in order to classify email messages that were not classified based on the curated rules. In this manner, the subject technology provides a two-pass approach to classifying email messages.

Figure 3:
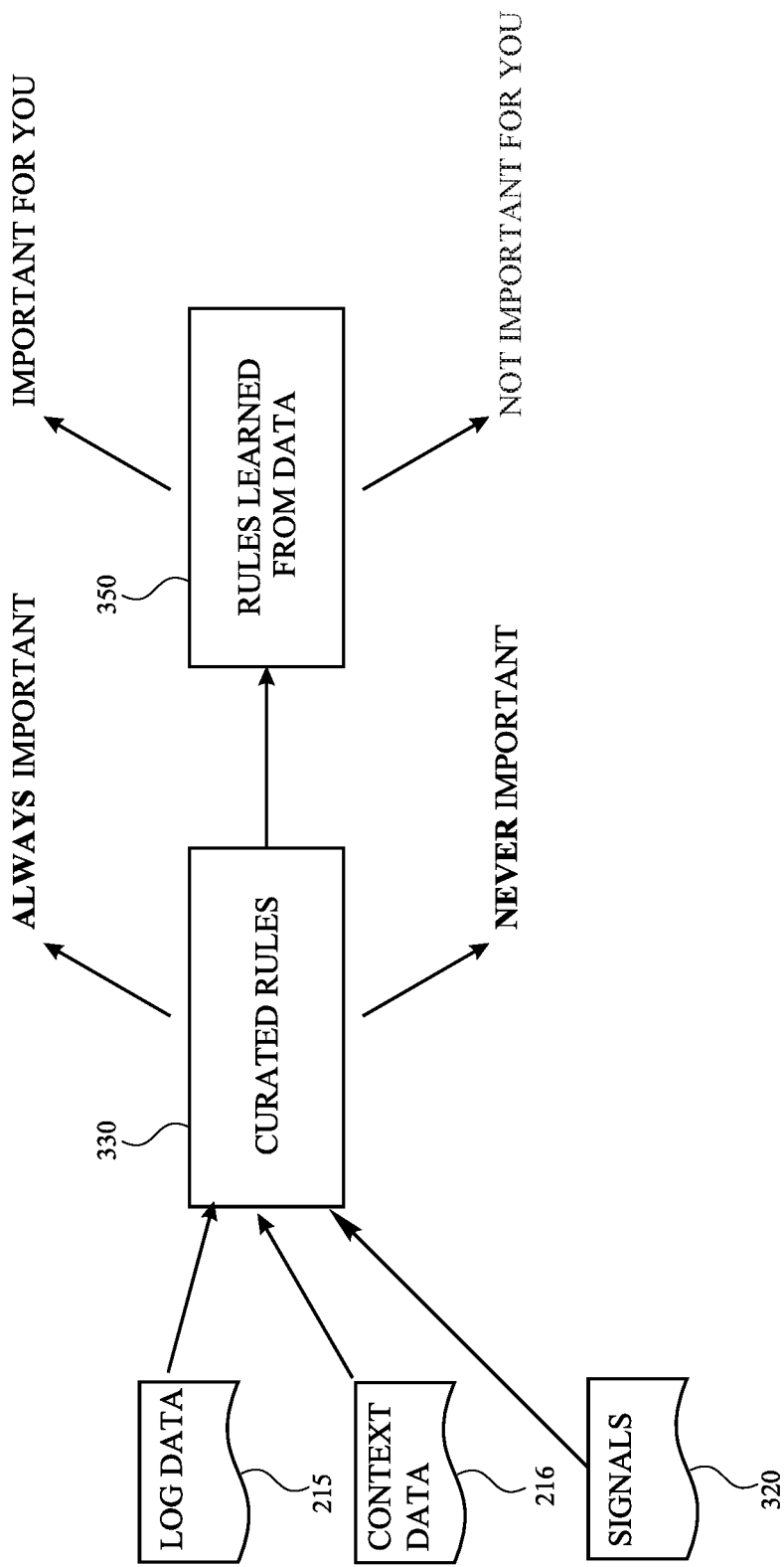
FIG. 3 illustrates example sets of rules used in the subject system in accordance with one or more implementations.

FIG. 3 illustrates example sets of rules used in the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In an implementation, the rules illustrated in FIG. 3 may be provided by the ML application 240 (e.g., the rules engine which uses the ML model 230) and applied to signals obtained from email data (e.g., the email data 210), log data (e.g., the log data 215), and/or context data (e.g., the context data 216) to classify email messages of a user as important to the user. In FIG. 3, signals 320 obtained from the email data, the log data 215, and/or the context data 216 can be received by the rules engine and applied to curated rules 330 and/or rules learned from data 350 (e.g., "learned rules" as mentioned herein). As referred to herein and further below the term "conversation" can correspond to a set of email messages that have organized into or associated with a thread in the email application.

In an example, the curated rules 330 can include rules that can generally classify email messages as being important, such as based on explicit signals from the user. Such explicit signals from the user may include, for example, a message from an important sender, e.g. someone designated as important by the user, or a reply to an email thread previously participated in by the user. These example rules are intended to classify email messages that the rules engine can determine to be important.

In an implementation, the following are example rules that that may apply to classify an email as being important to the user: 1) an email message involves a VIP indicated in one of the header fields (e.g., From, To, CC, BCC), 2) any follow up on any thread in which the user replied, 3) when a particular thread is marked for notifications (e.g., when the particular thread is included in a category of emails that may be configured to not receive notifications (e.g., muted), the user in this instance can explicitly indicate that this particular thread is to provide notifications), then email messages for that marked thread is classified as being important, 4) an email message that is sent directly to the user (and only to the user), an email message where the user has replied to a different email from the same person in the user's contact list at least once in the last X hours, (e.g., 8 hours, 12, hours, 24 hours, etc.) 6) an email message from someone in the user's address book, 7) if a user moves a message in the same conversation into a folder of important messages, then the conversation (including future email messages) may persistently stay important, 8) an email message received by a contact of the user, and 9) an email message from a high volume thread where if the user has been inactive but then receives a new email message that mentions the user by name (e.g. "@PersonABC, you've been quiet, what do you think?") then the new email message is classified as important.

In addition, the curated rules 330 can include rules that classify email messages as not being important to mitigate false positives. Examples include a rule that states "do not classify an email message as important in a thread after the user has muted the thread" or a rule that states "do not classify SPAM as important". As mentioned herein, muting a thread refers an event where a message with the same subject (e.g., in the same thread) goes into a different folder of the user's account instead of the main inbox and/or the user has configured that no notification is provided when such a message is received.

In an implementation, the following are example rules that always apply to classify an email as not being important: 1) any email message that is indicated as being SPAM (e.g., any email message that goes into the email application's SPAM filter), 2) a conversation that the user has muted, 3) an email from a contact that the user has blocked, 4) if a user moves an email message in the same conversation thread out of important, then the conversation (including future email messages) will remain classified as not important to the user, and 5) email messages from bots or mailing lists determined based on a set of rules that qualifies email messages as from a mailing list and/or bot.

As further illustrated, the rules learned from data 350 are based on the ML model 230 learning interpretable rules based on a context (e.g., the context data 216) that is derived using at least the log data 215. In an example, the ML model 230 (e.g., decision trees & variants) is predictable and includes explainable rules. An example rule could state "this email is marked important because you have replied to 30% of the email messages from this person over the past one month". This sort of personalization is enabled by the subject system based on features/signals sent to the ML model 230 that are user-specific and capture temporal changes in usage of email (e.g., email messages from some people are important today but email messages from the same people may not be important at a subsequent time).

In an implementation, user intent (e.g., as discussed further below as corresponding to "positive" or "negative" actions) may be given priority over the rules. Examples include: 1) if a user moves an email out of a not important folder and into an important folder, then the email persistently remains important, 2) if a user specifies someone as a VIP then any email from that someone is classified as being important, and 3) if a user mutes a thread, then the email does not get classified as being important.

In an implementation, for the rules learned from data 350, the ML model 230 will classify an email message as important when it is predicted that the user will perform at least one of the following "positive actions" within some time frame (e.g., "5 days") of first exposure (e.g., corresponding to a time when an email message is displayed in the email application) to the email message: 1) reply to the email message, 2) forward the email message, 3) read the email message where an email message is defined as being read based on the user tapping the email message and viewing the email message for at least a few seconds, and the like.

In an implementation, for the rules learned from data 350, the L model 230 will classify an email message as important when it is predicted that the user will perform at least one of the following "negative actions": 1) move an email message to a SPAM folder, 2) mute an email message or a thread including a set of email messages, and the like.

The subject system utilizes the rules learned from data 350 based on signals to capture user behavior. These are interpretable rules that: 1) capture temporal changes in a user's mail usage patterns, and/or 2) capture temporal changes in a user's implicit contacts.

In an implementation, additional examples of the rules learned from data 350 include 1) a rule to classify an email message as important where "the sender is one of the top X senders (e.g., five, ten, etc.) that the user has replied to in the last Y days (e.g., 20, 30, etc.), the number of recipients in this mail is Z (e.g., 1, 2, 3, etc.), AND there is a VIP in the CC field", and 2) a rule to classify an email message as not being important where "the user has replied to <X % (e.g., 1%, 2%, etc.) of the emails from this sender and the volume of email the user receives from this sender is more than Y (e.g., 10, 20, 100, etc.) per day".

In an example, the aforementioned rules are static rules when the model is deployed. The rules, however, may change when a new model is deployed after the model is retrained on new data.

Example additional rules that are supported include 1) a rule for "important contacts for email at the current time" to classify, as important, email messages from contacts that the user has most interacted with at the current time, 2) a rule for "important tokens at the current time" to classify email messages that correspond, in an example, to the user working on a new project with someone, or in another example, when a particular word is frequently found in email messages from the user therefore such mails that have the same word has increased a likelihood of the user replying, and 3) a rule for "important contacts from other system services or applications" to classify as important email messages from the user's recent most interacted contacts via other system apps.

The following discussion relates to signals that are utilized by the machine learning model, e.g. in addition to the current context, to determine whether to classify an email message as being important. The subject technology enables privacy of email messages by utilizing only a subset of the information from email messages instead of the entirety of the email messages and/or the body of the email messages with the contents (e.g., with identifiable information) of the email messages.

In an implementation, the subject system generates hashed data (e.g., using the hash generator 250) of various portions of the email messages where such portions correspond to respective signals. As mentioned before, each of the respective hashed data may be generated with a salt in order to preserve the privacy of the user's information. For example, using salts with hashes helps combat the use of hash tables (large list of pre-computed hashes for commonly used words or terms) and rainbow tables (e.g., precomputed table for reversing cryptographic hash functions) for determining dehashed content. The following are examples of information from the email messages that are utilized as respective signals to generate the aforementioned hashes:
    sender
    sender_is_vip
    num_attachments
    subject_words (hashed)
    user_is_to
    user_is_cc
    user_is_bcc In an implementation, all senders and message IDs are hashed and salted per user (e.g., using an cryptographic hash function such as SHA256). In this fashion, it would be difficult to determine if two users received the same message based on the hashed data. In an implementation, subject words of email messages may be hashed globally instead of using a salt per user.

In an implementation, the following examples describe a data format of a given log line in the log data 215 where each field is hashed by the hash generator 250 with a salt per user. An example log line may include at least the following data:
    platform
    device ID
    locale
    user ID
    date UTC
    date local
    account ID (e.g., user's email address
    mailbox ID
    conversation ID
    message ID
    event name
    event data As mentioned above, a given log line may include an event name and event data. Examples of event names and corresponding event data (any of which may be hashed) include the following:

| Event Name | Event Data |
| --- | --- |
| message fetched | sender, sender domain, subject words, message is reply, message is forwarded, user is To, user is CC, user is BCC, data received, [to, cc, bcc] address, [to, cc, bcc] domain, [to, cc, bcc] is VIP, [to, cc, bcc] contact ID, references, direct parent, list ID |
| message sent | Includes at least the same event data as the message fetched event |
| message list display started | position, cell style (e.g., single thread expanded, top hit), message list type (e.g., VIP, flagged, unread, includes me, has attachments, notify thread, mute threads, today, category, mail box, junk, archive, trash, sent, drafts, outbox, inbox) |
| message list display ended | duration, cell style |
| message moved | mailbox ID |
| message copied | mailbox ID |
| link clicked | schema (e.g., http, https, etc.) |
| flag changed | true/false |
| read changed | true/false |
| marked category | value: "important", "not_important", "promotion", "not_promotion", "uncategorized", "revert" features: All features that were used for original prediction. Can be null if no features were used in model |
| inferred category | value: same as in the marked category event score version features reason |

Figure 4:
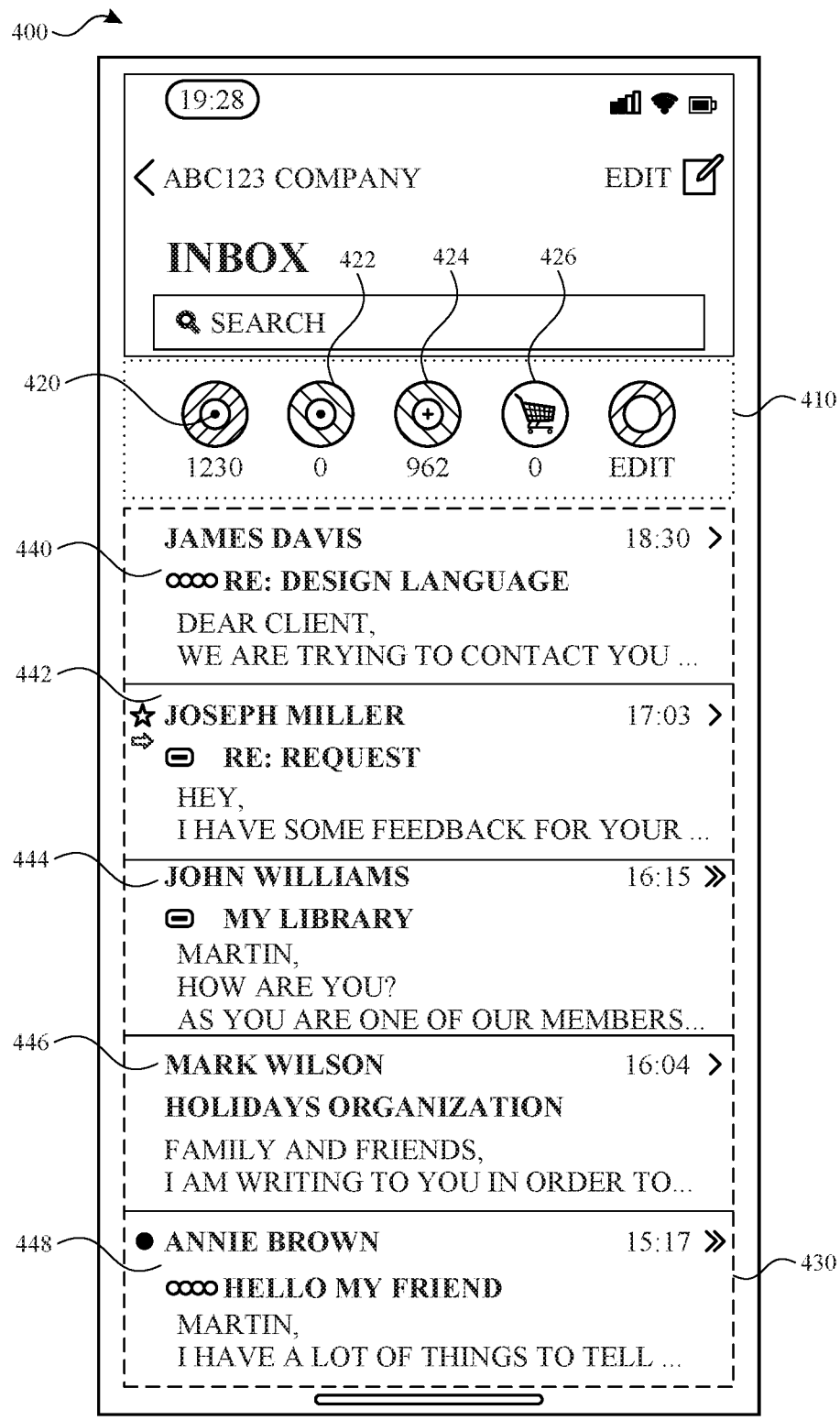
FIG. 4 illustrates an example user interface (UI) of an email application in accordance with one or more implementations.

Further, the machine learning model utilizes context to determine one or more learned rules. Context, as described before, is based on a historical aggregation of signals over a period of time that represents the current state of the user's history with messages. The following are examples of context (e.g., features) on which the learned rules are based on:
1. a number of emails from this sender that the user ignored/replied/sent/forwarded over the past 7 days
2. a fraction of emails from this sender that the user has replied to over the past 7 days
3. a number of times the user has flagged an email from a particular person over the past month 4. a fraction of mails from a a person that the user has spent more than 30 seconds reading FIG. 4 illustrates an example user interface (UI) of an email application in accordance with one or more implementations. FIG. 4 will be discussed with reference to portions of FIG. 2 described above.

As shown in FIG. 4, UI 400 includes a graphical area 410 with various graphical elements corresponding to different groups of email messages. The graphical area 410 includes a graphical element 420, graphical element 422, graphical element 424, and graphical element 426 where each of the aforementioned graphical elements correspond to different groupings (e.g., respective inboxes) of email messages. For instance, the graphical element 420 represents a grouping of email messages that corresponds to a user's primary inbox 430. In an implementation, the user's primary inbox 430 includes email messages that have been classified as important email messages based on the previously discussed sets of rules (e.g., curated rules that are predetermined and/or learned rules that are learned by the ML model 230 using signals and/or context over a period of time, and email messages from other senders except for, e.g., email messages corresponding to promotional emails and/or social networking related emails. As further shown, a number of email messages corresponding to the user's primary inbox 430 associated with the graphical element 420 are displayed in the graphical area 410.

In the example of FIG. 4, the user's primary inbox 430 includes, as displayed in the UI 400, an email message 440, email message 442, email message 444, email message 446, and email message 448.

As also illustrated, the graphical element 422 represents a grouping of emails for social related emails, the graphical element 424 represents a group of emails for promotional entails, and the graphical element 426 represents emails related to shopping; however, the graphical elements 422, 424, 426 may correspond to any topic/categorization/classification of emails. As further shown, respective numbers of email messages corresponding to social related emails associated with the graphical element 422, promotional emails associated with the graphical element 424 are displayed in the graphical area 410, and shopping related emails associated with the graphical element 426. In an example, upon a selection of the graphical element 422 or the graphical element 424, a respective set of emails may be displayed in the UI 400 corresponding to the selection of the particular graphical element.

Figure 5:
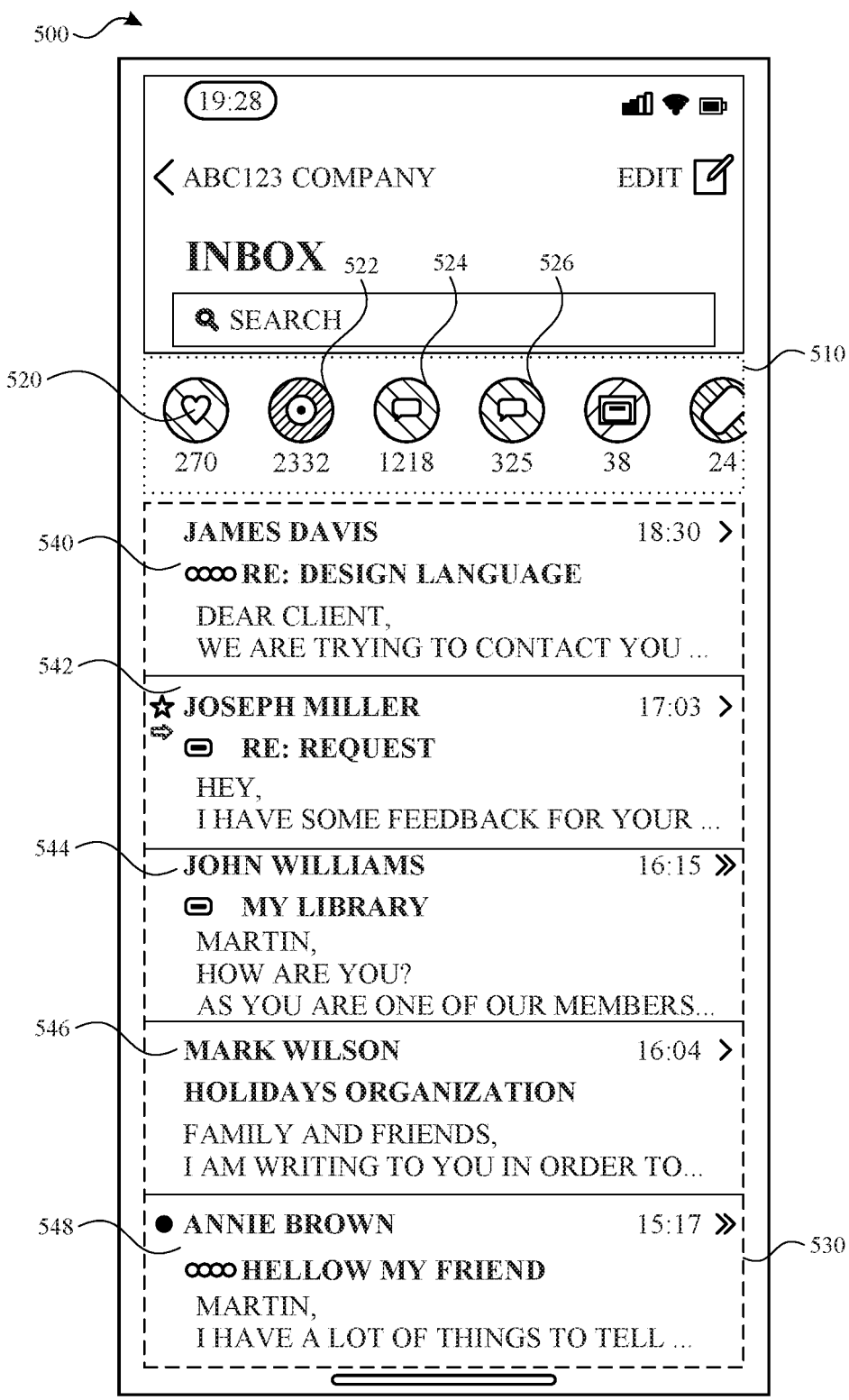
FIG. 5 illustrates another example UI of an email application in accordance with one or more implementations.

FIG. 5 illustrates another example UI of an email application in accordance with one or more implementations. FIG. 5 will be discussed with reference to portions of FIG. 2 described above. FIG. 5 provides a similar UI to the one described in FIG. 4 with the addition of a separate inbox solely for email messages that have been classified as being important by the ML model 230.

The graphical area 510 includes a graphical element 520, graphical element 522, graphical element 524, and graphical element 526 where each of the aforementioned graphical elements correspond to different groupings (e.g., respective inboxes) of email messages. For instance, the graphical element 520 represents a grouping of email messages that corresponds to emails that have been classified as being important (e.g., a user's "important inbox" 530). In an implementation, the user's important inbox includes email messages that have been classified as important email messages based on the previously discussed sets of rules (e.g., curated and/or learned rules) using signals and/or context over a period of time. As further shown, a number of email messages corresponding to the user's important inbox associated with the graphical element 520 are displayed in the graphical area 510.

In the example of FIG. 5, the user's important inbox includes, as displayed in the UI 500, an email message 540, email message 542, email message 544, email message 546, and email message 548.

As also illustrated, the graphical element 522 represents a grouping of emails for the user's primary inbox, the graphical element 524 represents a grouping of emails for social related emails, and the graphical element 526 represents a group of emails for promotional emails. As further shown, respective numbers of email messages corresponding to emails in the user's primary inbox associated with the graphical element 520, social related emails associated with the graphical element 522, and promotional emails associated with the graphical element 524 are displayed in the graphical area 510. In an example, upon a selection of the graphical element 522, the graphical element 524, and the graphical element 526, a respective set of emails may be displayed in the UI 500 corresponding to the selection of the particular graphical element.

Figure 6:
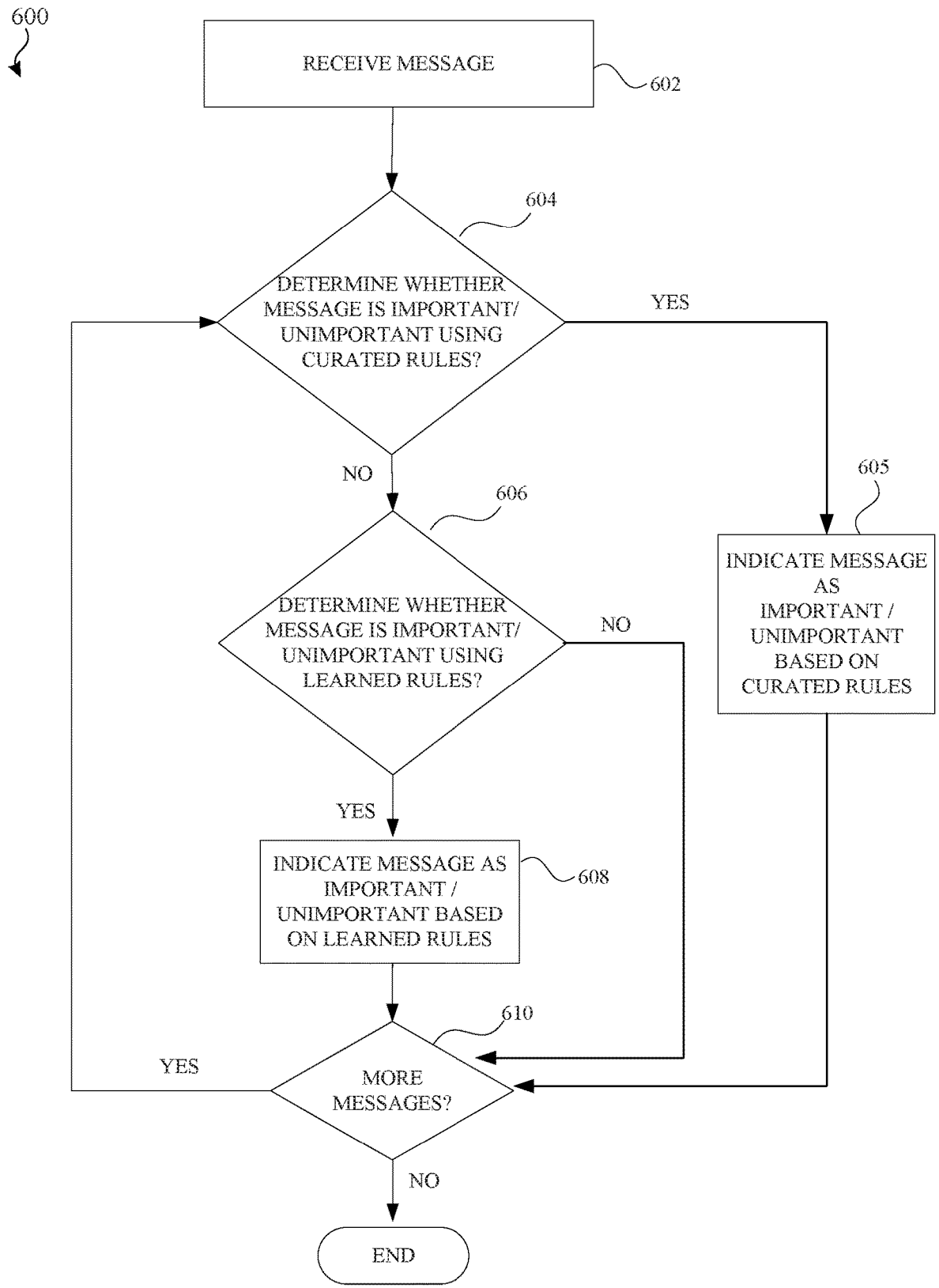
FIG. 6 illustrates a flow diagram of an example process for classifying messages while preserving privacy using curated rules in accordance with one or more implementations.

FIG. 6 illustrates a flow diagram of an example process for classifying messages while preserving privacy using curated rules in accordance with one or more implementations. For explanatory purposes, the process 600 is primarily described herein with reference to components of the computing architecture of FIG. 2, which may be executed by one or more processors of the electronic device 110 of FIG. 1. However, the process 600 is not limited to the electronic device 110, and one or more blocks (or operations) of the process 600 may be performed by one or more other components of other suitable devices, such as by the server 120. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The ML application 240 receives a message (e.g., email) (602). The MI, application 240 determines whether the message is important or unimportant using curated rules (604). As discussed before, such curated rules serve as "guardrails" to help ensure classification of emails is performed to prioritize a user intent (e.g., messages that are marked important are classified as being important, emails from VIPs are classified as important, etc.). As discussed before, a user intent can correspond to an action previously performed by the user (e.g., user indicating a particular person is a VIP, user marking an email/thread as important/unimportant, etc.) that indicates that an email message and/or thread is to be classified as important or unimportant. If so, the ML application 240 indicates that the message is important or unimportant (605). Alternatively, the ML application 240 determines whether the message is important or unimportant based on learned rules (606). In an example, the learned rules are rules that are learned by the ML model (e.g., the ML model 230) using the context (e.g., context data 216) and/or the logged data (e.g., the log data 215). If so, the ML application 240 indicates the message as important or unimportant (608). If there are more messages to process (610), the ML application can perform the operation starting at 604 for another message.

Figure 7:
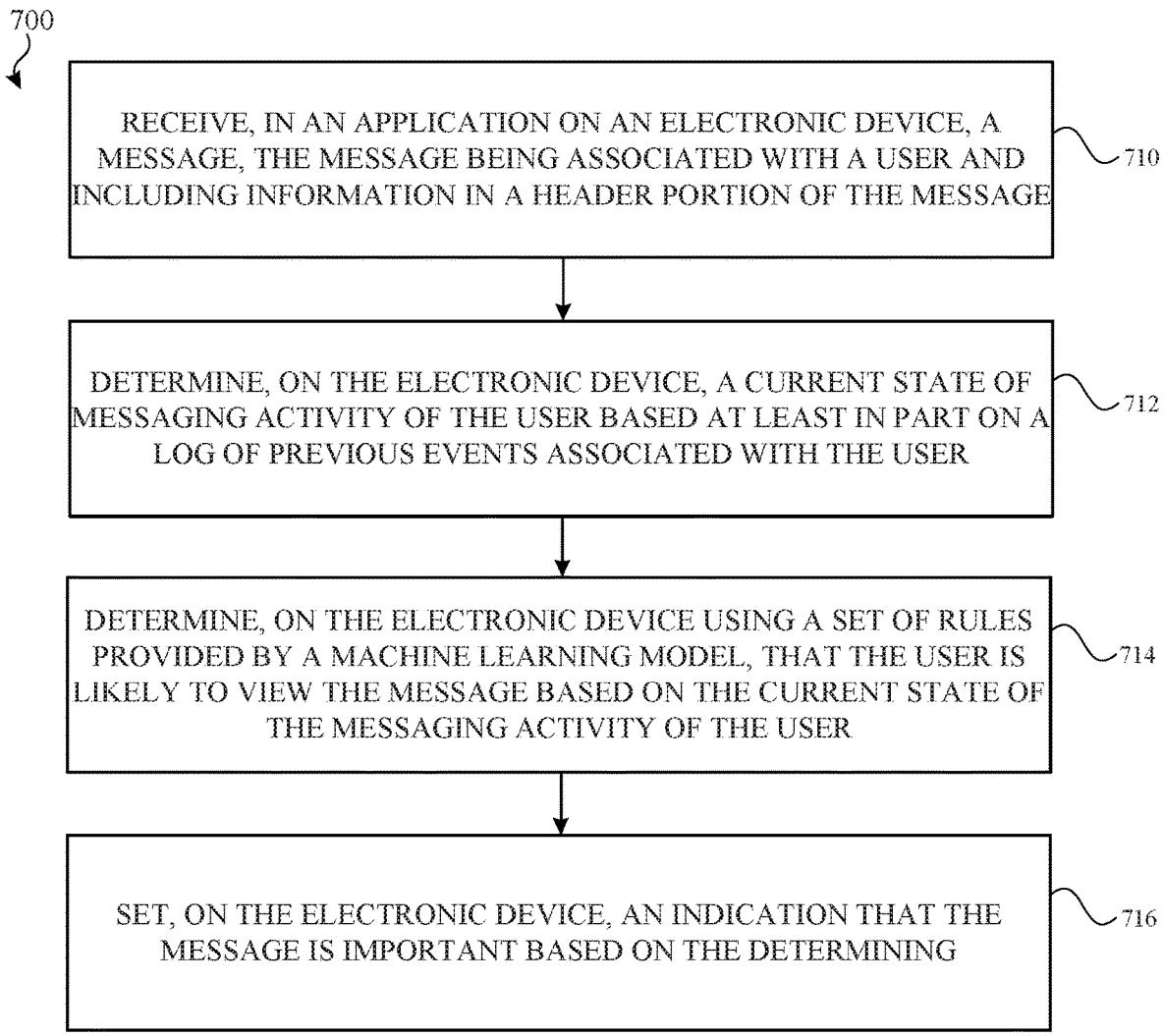
FIG. 7 illustrates a flow diagram of an example process for classifying messages while preserving privacy using learned rules in accordance with one or more implementations.

FIG. 7 illustrates a flow diagram of an example process for classifying messages while preserving privacy using learned rules in accordance with one or more implementations. For explanatory purposes, the process 700 is primarily described herein with reference to components of the computing architecture of FIG. 2, which may be executed by one or more processors of the electronic device 110 of FIG. 1. However, the process 700 is not limited to the electronic device 110, and one or more blocks (or operations) of the process 700 may be performed by one or more other components of other suitable devices, such as by the server 120. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The ML application 240 receives, in an application on an electronic device, a message, the message being associated with a user and including information in a header portion of the message (710).

The ML application 240 determines, on the electronic device, a current state of messaging activity of the user based at least in part on a log of previous events associated with the user, where the log of previous events includes information that has been hashed using a cryptographic hash function (712).

The ML application 240 determines, on the electronic device using a set of rules provided by a machine learning model, that the user is likely to view the message based on the current state of the messaging activity of the user (714).

The ML application 240 sets, on the electronic device, an indication that the message is important based on the determining (716).

Figure 8:
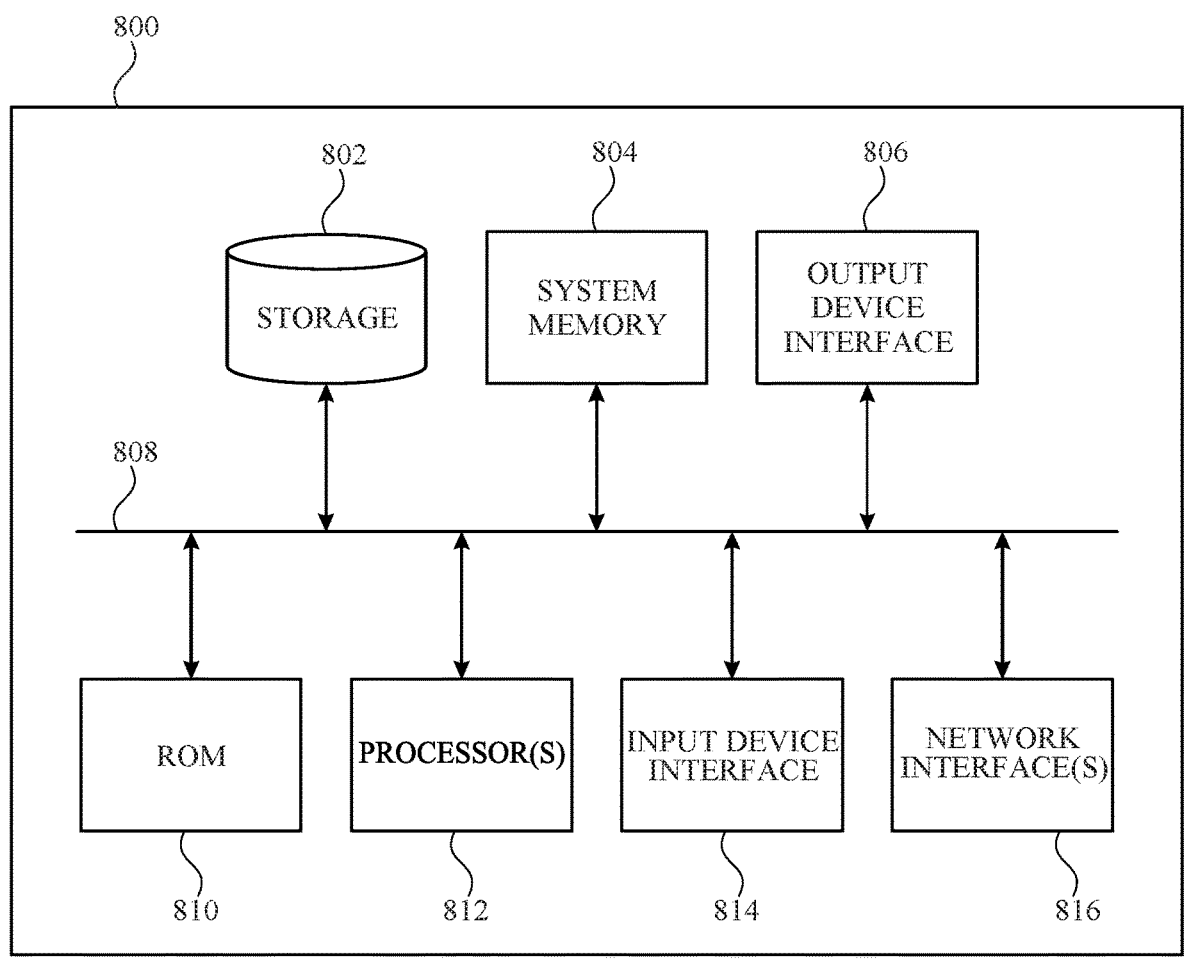
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 110, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 shown in FIG. 1, through the one or more network interface (s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by infecting preferences based on non-personal information data or a bare minimum amount of personal information, such as the content being requested by the device associated with a user, other non-personal information available to the content delivery services, or publicly available information.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
 receiving, in an application on an electronic device, a message, the message being addressed to a user and including information in a header portion of the message;
 determining, on the electronic device, a current state of messaging activity of the user based at least in part on a log of previous actions performed by the user, wherein the log of previous events includes information that has been hashed using a cryptographic hash function;

determining, on the electronic device using a set of rules previously provided by a machine learning model, that the user is likely to view the message based on the current state of the messaging activity of the user; and setting, on the electronic device, an indication that the message is important based on the determining.

2. The method of claim 1, further comprising:

receiving, in the application, a second message, the second message being associated with the user and including second information in a header portion of the second message;

determining, using a particular set of rules, that the second message is important, wherein the particular set of rules are predetermined rules that are provided without utilizing the machine learning model; and setting an indication that the second message is important based on the determining using the predetermined rules.

3. The method of claim 1, wherein the set of rules correspond to respective rules that have been learned by the machine learning model prior to receiving the message, and the log of previous actions performed by the user comprises at least an aggregation of actions performed by the user over a period of time.

4. The method of claim 1, wherein the log of previous actions performed by the user comprises one or more actions performed by the user on messages received by the application.

5. The method of claim 1, wherein the current state of messaging activity of the user indicates a likelihood that the user will read the message.

6. The method of claim 1, wherein the current state of messaging activity of the user is based on a number of messages from a sender of the message that the user has not read, replied, sent, or forwarded over a past period of time.

7. The method of claim 1, wherein the current state of messaging activity of the user is based on a fraction of messages from a sender of the message that the user has replied to over a past period of time.

8. The method of claim 1, wherein the machine learning model is trained at a server.

9. The method of claim 8, wherein the machine learning model is trained based at least in part on log data associated with email messages of respective users from respective electronic devices.

10. The method of claim 1, wherein the log of previous actions performed by the user includes information that has been hashed using a cryptographic hash function and a salt associated with the user, the salt comprises random data, the application comprises an email application, and the message comprises an email message.

11. A system comprising:

a processor;

a memory device containing instructions, which when executed by the processor cause the processor to:

receive, in an application on an electronic device, a message, the message being addressed to a user and including information in a header portion of the message;

determine, on the electronic device, a current state of messaging activity of the user based at least in part on a log of previous actions performed by the user, wherein the log of previous events includes information that has been hashed using a cryptographic hash function;

determine, on the electronic device using a set of rules previously provided by a machine learning model, that the user is likely to view the message based on the current state of the messaging activity of the user; and set, on the electronic device, an indication that the message is important based on the determining.

12. The system of claim 11, wherein the memory device contains further instructions, which when executed by the processor further cause the processor to:

receive, in the application, a second message, the second message being associated with the user and including second information in a header portion of the second message;

determine, using a particular set of rules, that the second message is important, wherein the particular set of rules are predetermined rules that are provided without utilizing the machine learning model; and set an indication that the second message is important based on the determining using the predetermined rules.

13. The system of claim 11, wherein the set of rules correspond to respective rules that have been learned by the machine learning model prior to receipt of the message, and the log of previous actions performed by the user comprises at least an aggregation of actions performed by the user over a period of time.

14. The system of claim 11, wherein the log of previous actions performed by the user comprises one or more actions performed by the user on messages received by the application.

15. The system of claim 11, wherein the current state of messaging activity of the user indicates a likelihood that the user will read the message.

16. The system of claim 11, wherein the current state of messaging activity of the user is based on a number of messages from a sender of the message that the user has not read, replied, sent, or forwarded over a past period of time.

17. The system of claim 11, wherein the current state of messaging activity of the user is based on a fraction of messages from a sender of the message that the user has replied to over a past period of time.

18. The system of claim 11, wherein the current state of messaging activity of the user is based on a number of times the user has flagged a respective message from a sender of the message over a past period of time.

19. The system of claim 11, wherein the log of previous actions performed by the user_includes information that has been hashed using a cryptographic hash function and a salt associated with the user.

20. A non-transitory computer-readable medium comprising instructions, which when executed by a computing device, cause the computing device to perform operations comprising:

receiving, in an application on an electronic device, a message, the message being addressed to a user and including first information in a header portion of the message;

determining, on the electronic device, a current state of messaging activity of the user based at least in part on a log of previous actions performed by the user, wherein the log of previous events includes second information that has been hashed using a cryptographic hash function, the second information that has been hashed corresponding to data only from a header portion of a message and excluding data from a body portion of the message;

determining, on the electronic device using a set of rules previously provided by a machine learning model, that the user is likely to view the message based on the current state of the messaging activity of the user; and setting, on the electronic device, an indication that the message is important based on the determining.

21. The method of claim 1, wherein determining, on the electronic device using the set of rules previously provided by the machine learning model, that the user is likely to view the message based on the current state of the messaging activity of the user comprises determining, on the electronic device using the set of rules previously provided by the machine learning model, that the user is likely to view the message based on the current state of the messaging activity of the user and the information in the header portion of the message.

22. The method of claim 21, wherein the information that has been hashed using the cryptographic hash function comprises information associated with one or more other users of one or more other electronic devices, and wherein the information that has been hashed using the cryptographic hash function has been generated in part by performing privacy performing operations for the one or more other users, the privacy preserving operations including:

hashing only a subset of the information associated with the one or more other users, the subset corresponding to data only from header portions of one or more prior messages received at the electronic device in association with the one or more other users and excluding data from body portions of the one or more prior messages; and anonymizing the header portions of the one or more prior messages by hashing the header portions of the one or more prior messages using a salt.

23. The method of claim 22, wherein the determining, on the electronic device using the set of rules previously provided by the machine learning model, that the user is likely to view the message based on the current state of the messaging activity of the user and the information in the header portion of the message comprises determining, on the electronic device using the set of rules previously provided by the machine learning model, that the user is likely to view the message based on the current state of the messaging activity of the user and the information in the header portion of the message after attempting to determine whether the message is important to the user using a curated rule that is provided without utilizing the machine learning model.

* * * * *

UNITED STATES PATENT AND TRADEMARK OFFICE
CERTIFICATE OF CORRECTION

PATENT NO. : 11,748,655 B2
APPLICATION NO. : 16/583131
DATED : September 5, 2023
INVENTOR(S) : Srikrishna Sridhar et al.

It is certified that error appears in the above-identified patent and that said Letters Patent is hereby corrected as shown below:

In the Specification

IN THE CROSS-REFERENCE TO RELATED APPLICATIONS Column 1, Line 10:
"May 2019," should read:
--May 31, 2019,--.

In the Claims

Column 20, Line 51 (Claim 19):
"user_includes information" should read:
--user includes information--

Signed and Sealed this
Twenty-third Day of January, 2024

Katherine Kelly Vidal
*Director of the United States Patent and Trademark Office*